Figure 1:
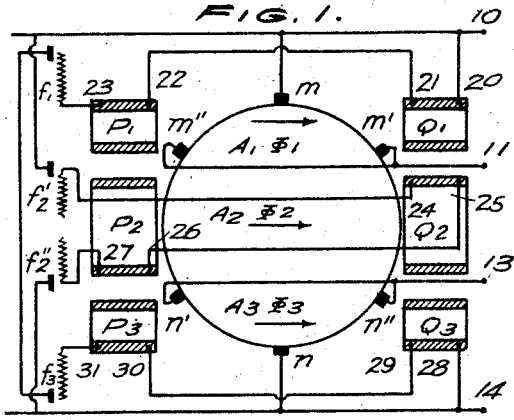

June 7, 1932.  A. DELLA RICCIA  1,862,427

PRESSURE SPLITTING DEVICE

Original Filed Dec. 2, 1921    3 Sheets-Sheet 1

Inventor
ANGELO DELLA RICCIA

June 7, 1932.  A. DELLA RICCIA  1,862,427

PRESSURE SPLITTING DEVICE

Original Filed Dec. 2, 1921   3 Sheets-Sheet 2

INVENTOR
ANGELO DELLA RICCIA
BY Langner, Parry, Card & Langner
ATTORNEYS

June 7, 1932. A. DELLA RICCIA 1,862,427

PRESSURE SPLITTING DEVICE

Original Filed Dec. 2, 1921  3 Sheets-Sheet 3

Inventor
Angelo Della Riccia,

Patented June 7, 1932

1,862,427

UNITED STATES PATENT OFFICE

ANGELO DELLA RICCIA, OF BRUSSELS, BELGIUM

PRESSURE SPLITTING DEVICE

Original application filed December 2, 1921, Serial No. 519,558, and in France December 16, 1920. Divided and this application filed October 28, 1927. Serial No. 229,467.

This application is a division of application 519,558 filed December 2, 1921 which has eventuated in Patent 1,759,759, granted May 20, 1930.

The invention relates to a direct current pressure splitting device for the supplying of electric current of variable pressure to electric apparatus such as motors for traction, hoisting, etc., motors for rolling mills, storage batteries, etc., from a main power line at a substantially constant pressure. In the case of applying the pressure splitting device to the regulating of the supply of motors for traction, hoisting or the like, the losses of energy are avoided in starting resistances or in mechanical brakes on descents and on stops, and it further provides for regeneration of energy on descent. For examples of this type of pressure splitting device applied to systems of control reference may be had to Patents 1,646,066 and 1,759,759.

Said pressure splitting device permits to obtain the division of the main line pressure V into different parts, all of which are at will continually variable; the use of gradually increasing or decreasing pressures upon the electric apparatus produces a reduction of losses during the operation of said apparatus, while at the same time, the use of connections, allowing the electric energy to proceed as much as possible directly from the main line to said apparatus, and thus to reduce, as far as possible, the use of the transformer elements (armatures or their parts) allows a reduction in size and weight of and in said elements. The pressure splitting device may on the other hand fulfill various secondary functions of a useful nature, such as the driving at suitable speed of exciters or other auxiliary apparatus which may be necessary to carry the invention properly into effect.

According to said prior Patent 1,759,759, the pressure splitting device comprises one armature subdivided in four parts connected in series between the two terminals of the main distributing line, the two end armature parts being equal and arranged in a symmetrical manner with respect to the two terminals of the line and the two intermediate armature parts being also equal and arranged in a symmetrical manner with respect to the same, and respective fields for all said armature parts with means, known per se, to vary at will equally the fluxes through the two end armature parts and to also vary at will equally, but in another manner as in the end armature parts, the fluxes through the two intermediate armature parts.

For applying said device to the regulating of the supply of electrical apparatus, said apparatus are subdivided into two equal separate groups, the outer terminals of which are permanently connected to the outer terminals of the pressure splitting device, while their inner terminals are connected to variable points between the armature parts thereof according to the phase of the operation. When applied to the regulating of the supply of traction or hoisting motors, the motors of each of the two separate groups sometimes are connected in shunt with one of the respective armature parts, and sometimes in shunt with the whole of the said end armature parts and the entire intermediate portion, the motors then acting either as motors or as generators.

The sum of the partial fluxes in the four armature parts may be, if desired, approximatively constant, in this case, the device as a whole, may constitute a motor adapted to drive, at a substantially constant speed, an auxiliary apparatus such as an independent exciter serving to excite the motors, when these are constructed as series motors, thus converting the same into separate excited motors with or without compound series winding, so as to provide for regeneration during descent or braking.

The middle armature parts in some cases are preferably joined to form a single armature part.

The invention also includes particular constructions of armatures and of inductors for repartition of the fluxes through the different windings.

Figure 2:
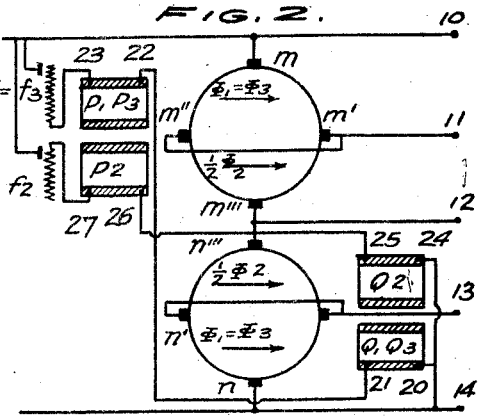
Figure 3:
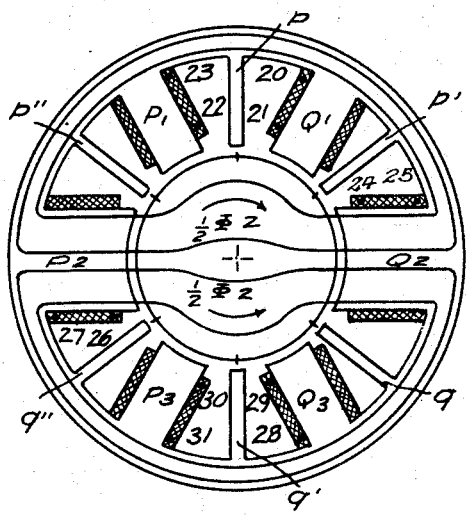
Figure 4:
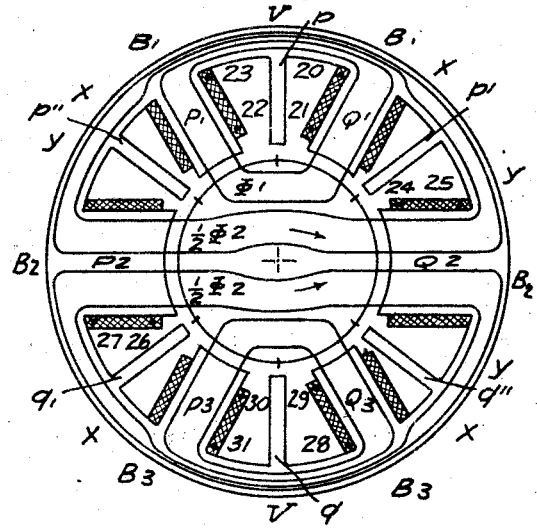
Figure 5:
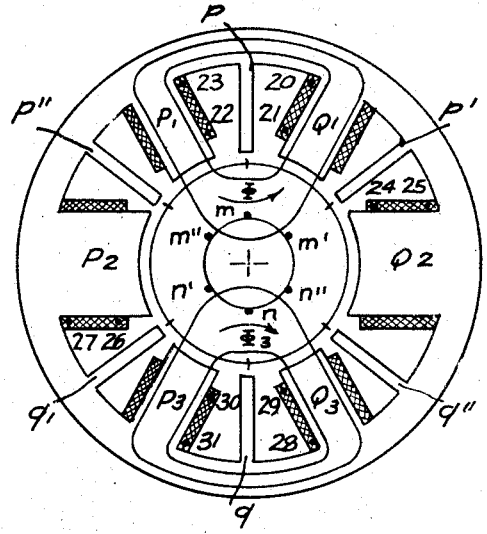
Figure 6:
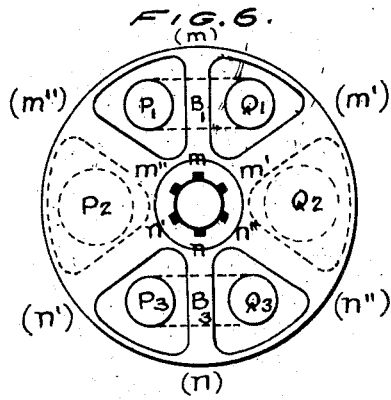
Figure 7:
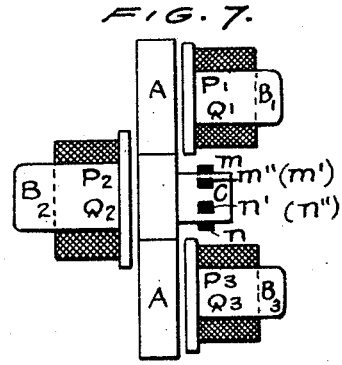
Figure 9:
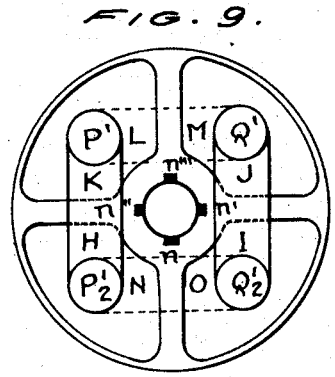
Figure 10:
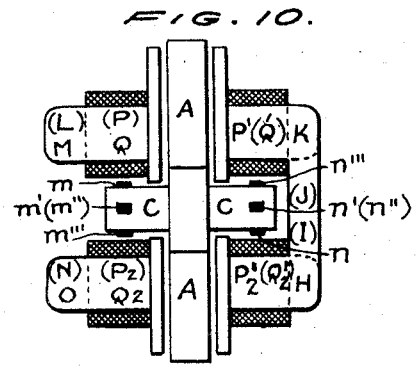
Figure 11:
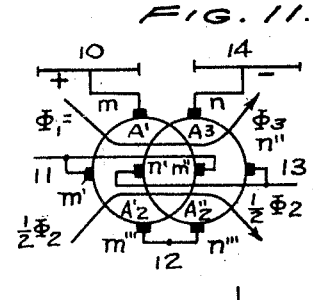
Figure 12:
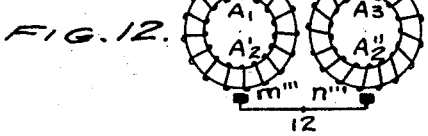
Figure 13:
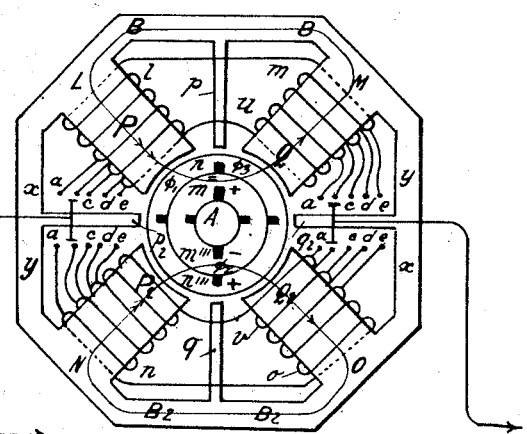
Figure 14:
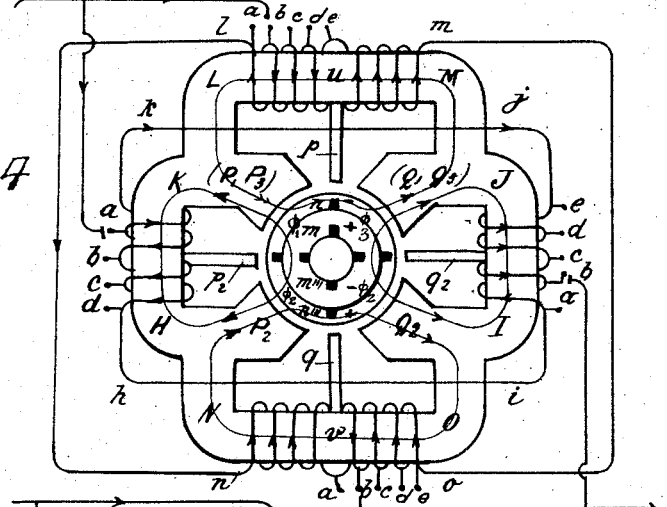
Figure 15:
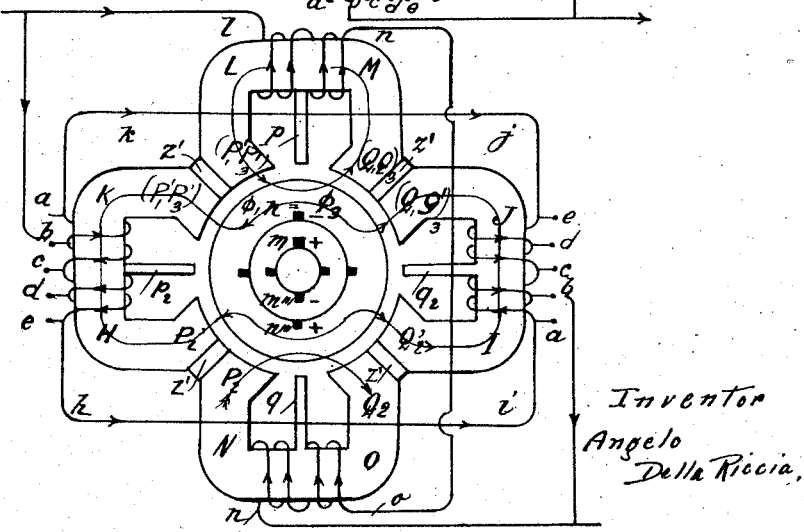

In the drawings forming a part hereof:

Fig. 1 shows the connections with the pressure splitting device having three armature parts on the same core and three field windings on poles subdivided in three parts, Fig. 2 shows the connections with the pressure splitting device having four armature parts on the same core and two field windings on poles subdivided in two parts, Figs. 3, 4, 5, 6, 7 and 8 are diagrams relating to forms of construction of the pressure splitting device having one armature with three armature parts, one commutator and two main field poles each of which is divided in three parts. Figs. 3, 4 and 5 relate to a form of machine with ring armature and radial field windings. Figs. 6 and 7 relate to a form of machine with flat ring armature and three field structures placed on the two sides of the armature, and Fig. 8 relates to a form of machine with ring armature and peripheral field windings in polygonal disposition, Figs. 9 to 15 are diagrams relating to forms of construction of the pressure splitting device having one armature with four armature winding parts, two commutators and two main field poles each of which is divided in two parts. Figs. 9 and 10 relate to a form of machine with flat ring armature and four field structures placed on the two sides of the armature. Fig. 11 is a diagrammatic view of the various parts of the armature with connections and Fig. 12 shows the two helicoidal windings of the armature which are wound in contrary directions. Figs. 13, 14, and 15 represent three different arrangements of machines, with the means for symmetrically varying the partial fluxes.

The pressure splitting device comprises four armature parts $A_1$, $A_2'$, $A_2''$, $A_3$ (whereof the two intermediate parts may be combined in a single armature part $A_2$) mounted on a common shaft and placed in series, in the indicated order, between the terminals of the main line at the substantially constant pressure V, these four (or three) armature parts being subjected to the action of two fields or of a field divided into two or three parts producing two equal magnetic fluxes $\phi_1$ and $\phi_3$ (or a single flux) through $A_1$ and $A_3$, and two other fluxes $\phi_2$, $\phi_2$ (which might be combined in one) through $A_2'$ and $A_2''$, so that $A_1$ shall produce at each instant the same pressure as $A_3$, and that (if $A_2'$ is separate from $A_2''$) the part $A_2'$ will produce the same pressure as $A_2''$.

Fig. 1 shows a pressure splitting device with three armature parts $A_1$, $A_2$, $A_3$, and three field windings $P_1 Q_1$—$P_2 Q_2$—$P_3 Q_3$ on two poles subdivided in three parts respectively $P_1 P_2 P_3$ and $Q_1 Q_2 Q_3$. Fig. 2 shows a pressure splitting device with four armature parts on the same armature core and two field windings on poles subdivided in two parts respectively $(P_1 P_3)$ $(Q_1 Q_3)$ and $P_2 Q_2$ and two field windings on poles subdivided in two parts respectively $(P_1 P_3)$ $P_2$ and $(Q_1 Q_3)$ $Q_2$.

The working apparatus, such as motors or battery, which are to be regulated, are divided as described in the Patent 1,760,777 into two equal groups, the end terminals of which are permanently connected with the terminals 10 and 14 of the main line while their intermediate terminals are variably connected with two terminals 11 and 13 situated between $A_1$ and $A_2'$ and between $A_2''$ and $A_3$; direct connections are used whereby the first apparatus can be subjected to the pressure of $A_1$, and the other apparatus to the pressure of $A_3$; crossed connections are used whereby the first apparatus is subjected to the combined pressure of $A_1$, $A_2'$ and $A_2''$ and the other apparatus to the combined pressure of $A_2'$ $A_2''$ and $A_3$. The two groups are thus in all cases subjected to two equal pressures, but these are taken from two separate and symmetrical parts of the pressure splitting device. This distinction and this symmetrical disposition constitute together with the permanency of the connection between the end terminals of the two groups and the terminals of the main line, the factors causing the exceptional economy of said system of regulation, as compared to all other systems, of like nature.

Various forms of construction of the pressure splitting device may be used, whereby the size and weight of the machine can be reduced, and in Figures 3 to 12 some of these forms are shown. Several general combinations are shown, each having modifications which will be described in connection therewith.

Referring to Figs. 3, 4 and 5 which show the first arrangement or combination it will be noted that the machine has two main poles each divided into three parts $P_1$, $P_2$, $P_3$ and $Q_1$, $Q_2$, $Q_3$ respectively with six fixed brushes $m$, $m'$, $m''$, $n$, $n'$, $n''$ (to clarify the drawings the commutator is shown in Fig. 5 only) and if required with six auxiliary poles $p$, $p'$, $p''$, $q$, $q'$, $q''$, wherein the three fluxes to be regulated $\phi_1$ $\phi_2$ $\phi_3$ total of which is at each time equal to a constant value $\phi$ $$(\phi_1 + \phi_2 + \phi_3 = \phi)$$

proceed respectively from the partial poles $P_1$ $P_2$ $P_3$ to the partial poles $Q_1$ $Q_2$ $Q_3$ through the armature A as indicated by the arrow. By reason of the difference between the maximum values to be given to the three fluxes, the intermediate partial poles $P_2$ $Q_2$ should have substantially double the cross-section of each of the end partial poles $P_1 Q_1$ and $P_3 Q_3$.

The auxiliary or correcting poles $p$ $p'$, $q''$ $q$ $q'$ $p''$ may be each excited by the current passing through the corresponding brushes $m$, $m'$, $n''$, $n$, $n'$, $m''$.

Figs. 3, 4 and 5 show the distribution in the armature of the three fluxes at the three characteristic instants wherein:

$\phi_1 = \phi_3 = 0$ and $\frac{1}{2}\phi_2 = \frac{1}{2}\phi_2 = \frac{1}{2}\phi$ (Fig. 3)
$\phi_1 = \phi_3 = \frac{1}{4}\phi$ and $\frac{1}{2}\phi_2 = \frac{1}{2}\phi_2 = \frac{1}{4}\phi$ (Fig. 4)
$\phi_1 = \phi_3 = \frac{1}{2}\phi$ and $\frac{1}{2}\phi_2 = \frac{1}{2}\phi_2 = 0$ (Fig. 5)

To produce the three variable fluxes, six radial windings are arranged in pairs on the pole pieces $B_1 P_1$ and $Q_1 B_1$; $B_2 P_2$ and $Q_2 B_2$, $B_3 P_3$ and $Q_3 B_3$ as designated in Fig. 4. The separate pairs are arranged between the main supply lines and have the necessary magneto-motive force to produce the three fluxes through the two respective air gaps.

As shown in Fig. 3 at a given instant it is necessary to prevent the fluxes produced by the winding 24, 25, 26, 27 being partially closed by means of the poles $P_1 Q_1 P_3 Q_3$; for this purpose the windings of said poles may be used to produce a little excitation which increases the residual magnetism.

As shown in Fig. 5, at another given instant, it is necessary to prevent the two fluxes produced by the windings 20, 21, 22, 23 and 28, 29, 30 and 31 being partially closed by means of the poles $P_2 Q_2$; for this purpose the windings of said poles may be used to produce a little excitation which increases the residual magnetism.

An arrangement of this kind (with two poles in three parts) is obtained (Figs. 6 and 7) by using a flat ring armature A and mounting the two fields $P_1 B_1 Q_1$ and $P_3 B_3 Q_3$ on one side thereof and the fields $P_2 B_2 Q_2$ on the other side. As concerns the brushes these may be placed around the usual commutator C or around the cylindrical surface of the flat ring, where denuded conductors may constitute a large commutator as is well known.

Figure 8:
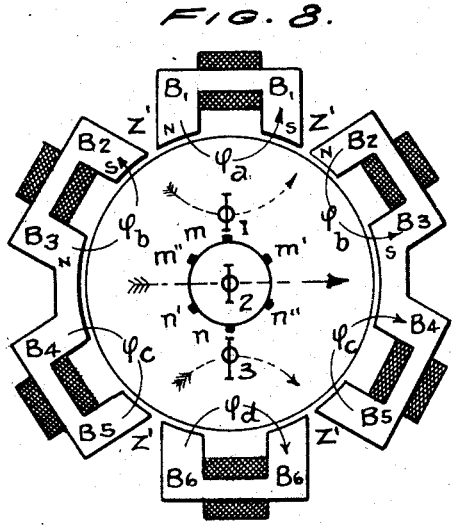

In the machine having poles divided into three parts, instead of radial field windings as shown in Figures 3, 4 and 5, it is possible to use peripheral field windings as shown in Figure 8. But in this case the three fluxes $\phi_1 \phi_2 \phi_3$ are obtained by the composition of four fluxes $\phi_a \phi_b \phi_c \phi_d$ in this way: $\phi_1 = \phi_a - \phi_b$, $\phi_2 = \phi_b + \phi_c$, $\phi_3 = \phi_c + \phi_d$ ($\phi_a$, $\phi_b$, $\phi_c$ and $\phi_d$ being respectively furnished by the parts $B_1 B_1, B_2 B_3, B_4 B_5, B_6 B_6$).

If we maintain $\phi_a$ and $\phi_d$ permanently equal to $\frac{1}{4}\phi$ and let vary $\phi_b$ and $\phi_c$ from $\frac{1}{4}\phi$ to $\frac{1}{4}\phi$ and from $\frac{1}{4}\phi$ to 0, or inversely in the following manner:

$\phi_a$ equal successively to: $\frac{1}{4}\phi$ $\frac{1}{4}\phi$ $\frac{1}{4}\phi$ (i.e. constant)
$\phi_b$ equal successively to: $\frac{1}{4}\phi$ $\frac{1}{4}\phi$ 0
$\phi_c$ equal successively to: $\frac{1}{4}\phi$ $\frac{1}{4}\phi$ 0
$\phi_d$ equal successively to: $\frac{1}{4}\phi$ $\frac{1}{4}\phi$ $\frac{1}{4}\phi$ (i.e. constant)

then $\phi_1$ and $\phi_3$ will vary from 0 to $\frac{1}{4}\phi$ and from $\frac{1}{4}\phi$ to $\frac{1}{2}\phi$ or inversely, and $\phi_2$ will vary from $\phi$ to $\frac{1}{2}\phi$ to $\frac{1}{2}\phi$ and from $\frac{1}{2}\phi$ to 0 or inversely that is:

$\phi_1$ equal successively to: 0 $\frac{1}{4}\phi$ $\frac{1}{2}\phi$
$\phi_2$ equal successively to: $\phi$ $\frac{1}{2}\phi$ 0
$\phi_3$ equal successively to: 0 $\frac{1}{4}\phi$ $\frac{1}{2}\phi$ The total sum remaining constantly equal to $\phi$ as desired.

But in this case it is required to prevent the right and left hand variable fluxes from closing their circuit by passing through the upper and lower magnetic circuits without passing through the armature. It is thus required to provide four air gaps $z'$ (Fig. 8) of sufficient size between the two halves of each of the end partial poles $P_1 Q_1 P_3 Q_3$ and in order to reduce as much as possible the magnetic surfaces on each side of these air gaps, the latter parts and the machine bolts should be of a non-magnetic alloy. Inasmuch as these radial air gaps $z'$ $z'$ $z'$ $z'$ completely separate the two halves of the two end partial poles between two consecutive brushes the transverse fluxes which would tend to be produced by the current flowing in the armature between two brushes cannot pass across these gaps. These air gaps will moreover act to reduce a portion of the armature reaction.

In a second arrangement or another construction (Figs. 11 to 15), a machine is provided having two main poles each subdivided into two parts $P P_2$ and $Q Q_2$ (and if desired, having four commutation poles $p$ $q$ $p_2$ $q_2$) with an armature A having two windings and two separate commutators, each of the latter using four brushes $m, m', m'', m''', n, n', n'', n'''$. The two windings which are progressive windings when the machines are bipolar are wound in opposite directions (Fig. 12) in such manner that those of the end brushes $m, m''', n''', n$ which are comprised between the main half-poles P and Q, that is, $m$ and $n$ (corresponding to the same auxiliary pole $p$) as well as those comprised between the main half poles $P_2$ and $Q_2$, that is, $m'''$ and $n'''$ (corresponding to the same auxiliary pole $q$) shall have opposite polarities in pairs.

The two windings are connected in series (Fig. 11) in such manner that the two E. M. F.'s will be added to each other, by connecting $m'''$ with $n'''$. In this case the two half-windings comprised on the one hand between $m$ and $(m'\ m'')$ and on the other hand between $(n'\ n'')$ and $n$ are acted upon by the flux proceeding from P to Q and the two half-windings comprised on the one hand between $(m'\ m'')$ and $m'''$ and on the other hand between $n'''$ and $(n'\ n'')$ are acted upon by the flux proceeding from $P_2$ to $Q_2$.

The first of these fluxes should also vary as follow: 0, $\frac{1}{2}\phi$, 0, $\frac{1}{2}\phi$, 0, while the second should now vary as follows: $\frac{1}{2}\phi$, 0, $\frac{1}{2}\phi$, 0, $\frac{1}{2}\phi$, if the sum of the flux values should be constantly equal to $\frac{1}{2}\phi$ (a little more or less). To produce these variable fluxes, use may be made of four radial windings arranged in pairs on the arms LP, QM, $NP_2$, $Q_2$ O (Fig. 13) having the necessary magneto motive forces to produce the two fluxes through the two respective air gaps. These magneto motive forces should vary in the same sense as the fluxes and the E. M. F.'s to be produced.

Said two variable fluxes may also be obtained by the use of four peripheral windings having a polygonal disposition and placed on the portions LM, NO; KH, IJ (Fig. 14). The first two windings should have two E. M. F.'s and F'' of equal value, such that F' will produce $\phi_1$ and F'' will produce $\frac{1}{2}\phi_2$. The other two should have two magneto-motive forces $\frac{1}{2}$ F''' and $\frac{1}{2}$ F'''' giving together a magneto-motive force F'''' such that it will annul at each instant the total magneto-motive force in the peripheral circuit LMJIONHK; the magneto-motive force F'''' will therefore be changed alternately in direction.

An arrangement may also be used which is composed of four radial windings as above stated, with the addition of two intermediate peripheral windings on the yokes X and Y between L and N to the left and between M and O to the right in such manner as to annul at each instant the total magneto-motive force in the two circuits L P $P_2$ N and M Q $Q_2$ O (Fig. 13).

In this combination as in the preceding the same result may be attained by the use of two peripheral windings producing two fluxes of constant direction having the value $(\frac{1}{4}\phi)$ and two peripheral windings producing two fluxes $(+\frac{1}{4}\phi)$ which are changed alternately in direction. The four air gaps $z'$ (Fig. 15) prevent the right and left hand variable fluxes $$P_2P_2' - Q_2Q_2' - (P_1P_3)(P_1'P_3') - (Q_1Q_3)(Q_1'Q_3')$$

from closing their circuit by passing through the upper and lower circuits without passing through the armature.

Since the radial air gaps $z$, separating the partial poles between the brushes, are of an indefinite extension, they cannot be passed around by the transverse fluxes which would tend to be produced by the armature currents. This disposition has in the present case the effect of reducing substantially all the armature reactions.

A suitable arrangement may also be obtained by placing two pole pieces P L M Q and $P_2$ N O $Q_2$ on one side of a flat armature and two pole pieces P' K H $P_3'$ and Q' J I $Q_2'$ on the other side, with the poles P Q $P_2$ $Q_2$ situated respectively opposite the poles P' Q' $P_2'$ $Q_2'$ in the manner shown in Figs. 9 and 10.

The pressure splitting device according to my invention, either in the form of a group or in the form of a machine, may have field magnets with more than two main poles, but such group or machine will ordinarily require not more than two poles to supply the necessary power to the two groups of apparatus to be controlled by this group or machine.

Field magnets with two main poles require, when the armatures ought to have two windings, that these windings be progressively wound. But if field magnets with more than two poles are necessary, a different style of winding may be used.

Whereas the machines for a given capacity, will have a short length and a large diameter, the groups, for the same capacity, will have a greater length and a smaller diameter. In view of this fact it is therefore necessary to consider the available space when designing the regulating device.

I claim:

1. A direct current transformer or pressure splitting machine with two extreme and at least two intermediate symmetrical terminals, consisting in a machine comprising a field structure with each pole subdivided in two end and other intermediate parts; the parts of the same range with respect to the center of the pole being equal so as to compose a symmetrical subdivided pole, two end armature winding parts and other intermediate armature winding parts, two end commutator parts and other intermediate commutator parts, each armature winding part subject to the flux of a corresponding part of said poles and proportioned to this part of said poles, two main brushes at the two ends of the armature winding taken as a whole connected to the two terminals of the main distributing line, a pair of auxiliary brushes between each two consecutive armature winding parts, and means to vary in a like manner the fluxes through the two end winding parts and to vary as desired the whole of the fluxes through the intermediate winding parts, so as to vary symmetrically the pressures at the intermediate terminals of the machine with respect to the pressures applied to the extreme terminals of the machine.

2. A direct current transformer or pressure splitting machine with two extreme and at least two intermediate symmetrical terminals, consisting in a machine comprising a field structure with each pole subdivided in two end and other intermediate parts, the parts of the same range with respect to the center of the pole being equal so as to compose a symmetrical subdivided pole, two end armature winding parts and other intermediate armature winding parts, two end commutator parts and other intermediate commutator parts, each armature winding part subject to the flux of a corresponding part of the said poles and proportioned to this part of said poles, two main brushes at the two ends of the armature winding taken as a whole connected to the two terminals of the main distributing line, a pair of auxiliary brushes between each two consecutive armature winding parts, and means to vary in a like manner the fluxes through the two end winding parts and to vary the whole of the fluxes through the intermediate winding parts so as to maintain substantially constant the total flux through the whole of the winding parts of the armature, so as to vary symmetrically the pressures at the intermediate terminals with respect to the pressure applied to the extreme terminals of the machine, and so as to maintain substantially constant the speed of the machine.

3. A direct current transformer or pressure splitting machine, with two extreme and at least two intermediate symmetrical terminals, consisting in a machine comprising an armature with two similar windings, such windings being wound in opposite directions and each winding being subdivided in two equal parts, two commutators with each half-periphery thereof likewise subdivided in two equal parts, two main brushes and a pair of intermediate brushes on each commutator, the two main brushes on the same side of the shaft and corresponding with the extreme parts of the armature windings being connected to the two terminals of the line and the two main brushes on the other side of the shaft and corresponding with the intermediate parts of the armature windings being connected together, a field structure whose poles are subdivided in two equal parts, one of which being provided for the half-armature carrying the two end winding parts connected to the line, the other part for the half-armature carrying the two intermediate winding parts connected together, and means to vary the flux through the two end winding parts and to vary as desired the flux through the two intermediate parts, so as to vary symmetrically the pressures at the intermediate terminals of the machine with respect to the pressures applied to the extreme terminals of the machine.

4. A direct current transformer or pressure splitting machine, with two extreme and at least two intermediate symmetrical terminals, consisting in a machine comprising an armature with two similar windings, such windings being wound in opposite directions and each winding being subdivided in two equal parts; two commutators with each half-periphery thereof likewise subdivided in two equal parts, two main brushes and a pair of intermediate brushes on each commutator, the two main brushes on the same side of the shaft and corresponding with the extreme parts of the armature windings being connected to the two terminals of the line and the two main brushes on the other side of the shaft and corresponding with the intermediate parts of the armature windings being connected together, a field structure whose poles are subdivided in two equal parts, one of which being provided for the half-armature carrying the two end winding parts connected to the line, the other part for the half-armature carrying the two intermediate winding parts connected together, and means to vary the flux through the two end winding parts and to vary by an equal quantity but in an opposite direction the flux through the two intermediate parts, so as to vary symmetrically the pressures at the intermediate terminals with respect to the pressures applied to the extreme terminals of the machine, and so as to maintain substantially constant the speed of the machine.

5. A direct current transformer or pressure splitting machine with two extreme and at least two intermediate symmetrical terminals, consisting in a machine comprising an armature with two similar windings, such windings being wound in opposite directions and each winding being subdivided in two equal parts, two commutators with each half periphery thereof likewise subdivided in two equal parts, two main brushes and a pair of intermediate brushes on each commutator, the two main brushes on the same side of the shaft being connected to the two terminals of the line and the two main brushes on the other side of the shaft being connected together, a normal field structure whose poles are subdivided in two equal parts, one of which being provided for the half-armature carrying the two end winding parts connected to the line, the other part for the half-armature carrying the two intermediate winding parts connected together, and auxiliary field structures suitably arranged with means to produce variable supplementary fluxes and to add them, positively and negatively, to the normal fluxes through the two armature halves, so as to vary symmetrically the pressure at the intermediate terminals with respect to the pressures applied to the extreme terminals of the machine and so as to maintain substantially constant the speed of the machine.

6. A direct current transformer or pressure splitting machine comprising: two armature winding parts directly connected to the two terminals of the line and constituting end winding parts and a group of armature winding parts constituting intermediate winding parts connected in series between said two end armature winding parts, all the armature winding parts being wound on the same armature core, said two end armature winding parts having each a commutator part fitted to half the line tension and said group of intermediate armature winding parts having commutator parts fitted together to the full line tension; field structures for said two end armature winding parts; field structures for said group of intermediate armature winding parts; means to vary on one side the magnetic fluxes through the two end armature winding parts so that these two fluxes are always equal each other; and means to vary the magnetic fluxes through the group of intermediate armature winding parts so that the sum of said fluxes vary in contrary sense of that of the sum of the fluxes through the two end armature winding parts.

7. A direct current transformer or pressure splitting machine comprising: two armature winding parts directly connected to the two terminals of the line and constituting end winding parts and a group of armature winding parts connected in series between said two end armature winding parts and constituting intermediate winding parts, all the armature winding parts being wound on the same armature core, said two end armature winding parts having each a commutator part fitted to half the line tension and said group of intermediate armature winding parts having commutator parts fitted together to the full line tension; field structures for said two end armature winding parts; field structures for said group of intermediate armature winding parts; means to vary on one side the magnetic fluxes through the two end armatures winding parts so that these two fluxes are always equal each other; and means to vary the magnetic fluxes through the group of intermediate armature winding parts so that the sum of all the fluxes (end and intermediate together) shall remain substantially constant.

In testimony whereof, I affix my signature.

ANGELO DELLA RICCIA.